May 30, 1967 J. H. L. PAGES 3,322,963
INTERMITTENTLY OPERATED CONTROLLER FOR MAINTAINING
A REGULATED PARAMETER AT A DESIRED VALUE
Filed Nov. 21, 1962 4 Sheets-Sheet 1

Inventor
Jacques H. L. Pages
By
Stevens, Davis, Miller & Mosher
Attorneys

May 30, 1967  J. H. L. PAGES  3,322,963
INTERMITTENTLY OPERATED CONTROLLER FOR MAINTAINING
A REGULATED PARAMETER AT A DESIRED VALUE
Filed Nov. 21, 1962  4 Sheets-Sheet 3

Inventor
Jacques H.L. Pages
By
Stevens, Davis, Miller & Mosher
Attorneys

United States Patent Office 3,322,963
Patented May 30, 1967

3,322,963
INTERMITTENTLY OPERATED CONTROLLER FOR MAINTAINING A REGULATED PARAMETER AT A DESIRED VALUE
Jacques H. L. Pages, Villeurbanne, France, assignor to Rhone Poulenc S.A., Paris, France, a French body corporate
Filed Nov. 21, 1962, Ser. No. 239,282
Claims priority, application France, Nov. 22, 1961, 879,740
7 Claims. (Cl. 250—219)

The present invention concerns an improvement in discontinuous two- or three-step action controllers.

The principle of the operation of such controllers intended to maintain a regulated quantity in the neighbourhood of a desired value is known. When the quantity deviates from the desired value, a detector observes the deviation and sends information to a controller, which restores the quantity to the desired value by transmitting discontinuous signals to a regulating unit. The detector reacts on an "on-off" basis, that is to say, it does not record the extent of the deviation between the quantity and the desired value, but simply the fact that the quantity no longer agrees with the desired value. Consequently, it continues to maintain the dispatch of information to the controller as long as the quantity has not returned to the desired value. If the regulated system displays some inertia, this return to the desired value does not immediately follow the first signal and the detector sends a series of signals, the effect of which is cumulative and causes the quantity to return with constantly increasing rapidity to the desired value. At the instant when the desired value is reached, the controller ceases its action, but owing to its inertia, the regulated system continues to change with the acquired speed and the quantity again deviates from the desired value, this time in the opposite direction. An opposing action of the regulating system is then required in order again to restore the desired value. The "on-off" action of the controller thus results in oscillations of which the amplitude, which depends upon the inertia of the system, may be considerable and may even sometimes increase at each oscillation.

These facts are graphically represented in FIGURE 1:
The values of the variable quantity X are plotted as ordinates, and the time as abscissae. Two areas (O) and (I) are separated by the line AL, which corresponds to desired value $X_0$ imparted to the regulating system. A detector is so adjusted that it reacts as soon as the value of X deviates from $X_0$. If, for example, the quantity to be adjusted commences to deviate from the value $X_0$ at the instant represented by the abscissa of the point A, by passing from the area O into the area I, the detector immediately reacts and transmits a signal to a correcting unit in order to restore the disturbed quantity to the desired value. Owing to the inertia of the system, the quantity has not yet returned to normal at the time corresponding to the point B. A second signal is then sent by the regulating system, which thus accentuates the correcting action. At the time corresponding to the point C, the quantity still continues to move away from the desired value, but at a lower speed. At the time corresponding to the point D, this deviation becomes a maximum, and then commences to decrease, but since the detector reacts on an "on-off" basis, the controller continues to send signals to the regulating unit at the times corresponding to the points E and F, and the return towards the desired value is accelerated at a constantly increasing rate. It is only when the system is in the condition represented by the point G that the detector ceases to send signals. However, at this instant, the desired value is exceeded, this time in the opposite direction, owing to the speed acquired under the action of the excess pulses. The quantity leaves the area I and enters further into the area O in accordance with the number of excess pulses and the duration of each of them.

The deviation in the area O may be detected by the same detector or another one, which will act in exactly the same way as before on the regulating system, but this time in the opposite direction in order to restore the deviation to zero value.

If the pulses could be stopped when the quantity to be adjusted is situated in the region D to E, the return to the desired value could be effected at lower speed, and this would result in a smaller deviation in the area O. However, since the detector acts on an "on-off" basis and not as a function of the value of the deviation, it is impossible to stop the pulses in the regulating systems under consideration.

The defect of these regulating systems is therefore that they maintain, in regulated systems having high inertia, operations of high amplitude about the desired value.

Various methods have already been employed for reducing the amplitude of the variations of the regulated quantity and damping its oscillations.

For example methods based on a displacement of the desired point as a function of the time of action on the regulating unit, and methods utilising a pulse-controlled action on the regulating unit are known.

The first of these methods has the disadvantage of displacing the desired point (which results in uncertainty to the operator). The second is sometimes insufficient to damp the oscillations of the regulated system.

The present invention relates to a new improvement in discontinuous two- or three-step action control systems.

According to the present invention there is provided a discontinuous controller for maintaining a regulated vector quantity at a desired value, such controller comprising a regulating unit for applying a controller correction to said quantity, a storage member which is adapted to record the total action (as hereinafter defined) of the controller on the quantity when the latter differs from the desired value and then, immediately the quantity returns to the desired value, to instruct the regulating unit to apply a correction of opposite direction to said controller correction and representing a fraction $1/K$ thereof where K is greater than 1.

By "total action" is meant the maximum correction which the regulating unit applies to bring the quantity to the desired value.

Under these conditions, the inverse (negative) deviation in relation to the desired value, which tends to occur under the effect of the excess pulses of the controller, is considerably reduced and persists for a shorter time (points G, H, I on the curve of FIGURE 1).

In order that the present invention may more easily be understood the following description is given, reference being made to the accompanying drawings in which.

Figure 2:
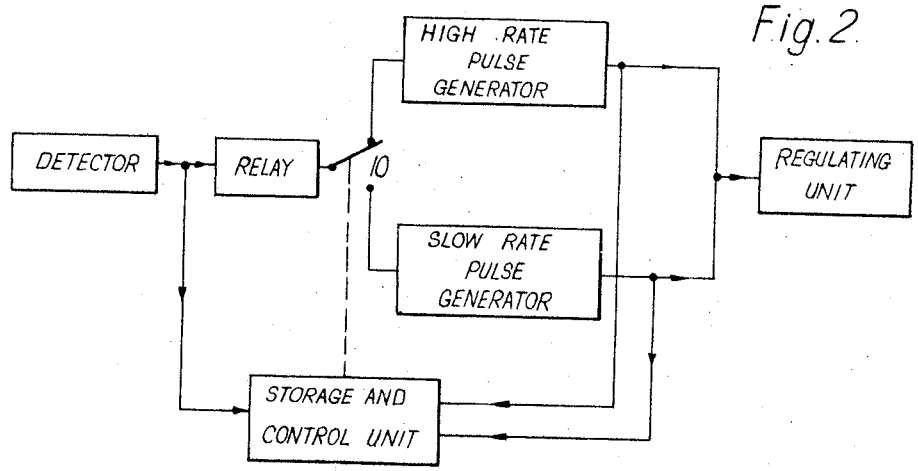
FIG. 2 is a schematic block diagram of a controller assembly of this invention.
Figure 3:
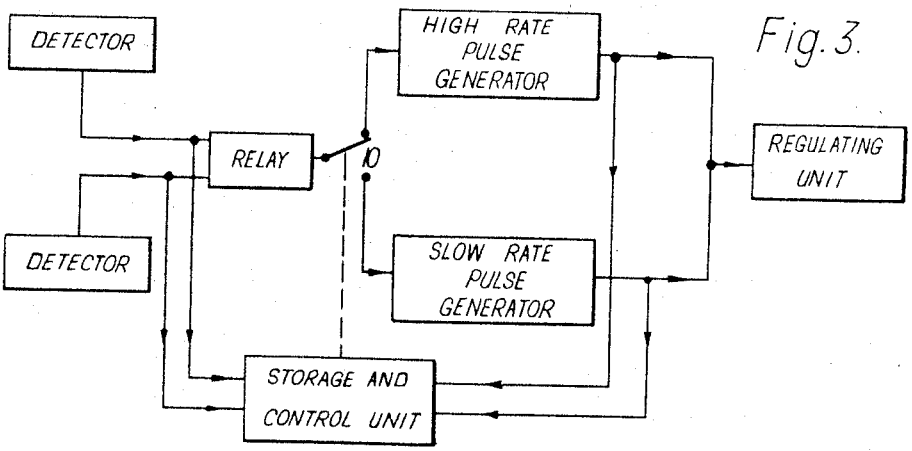
FIG. 3 is a view similar to FIG. 2 of a modified form of controller.

Reference will now be made to FIGS. 2 and 3 in which there will be seen:

(a) A control circuit of the usual type with its relay and its generator emitting so-called action or slow-rate pulses of adjustable duration and frequency.

(b) A compensating circuit comprising a storage and control unit having storage and control members, and a generator emitting counting-back or high-rate pulses, which are also of adjustable duration and frequency;

(c) Detector (FIGURE 2) or two detectors (FIGURE 3) and a regulating unit.

The various units of these circuits may be of any known type appropriate for the functions in question. They may be based on mechanical, electrical, electronic or pneumatic effects.

The pulse generators are preferably generators emitting signals having a common duration of pulse, for example from 0.5 to 5 seconds, but different dead times i.e. duration of no pulse. These dead times should be shorter in the signal of the high rate generator than in the signal of the slow rate generator. For example, a high rate generator having dead times adjustable between extreme values each representing a predetermined fraction, for example $1/10$ to $1/100$, of the extreme dead time values of the slow rate generator may be employed.

Figure 4:
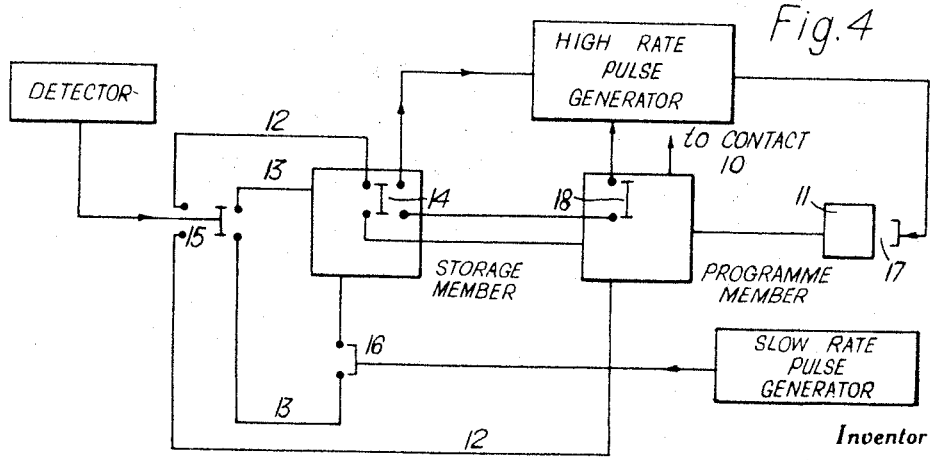
FIG. 4 shows in more detail a block diagram of the storage control unit of FIGS. 2 and 3.

The choice of the devices constituting the storage and control unit depends upon the nature of the means employed in the controller and upon the effects by which the total action to be recorded may be expressed. The latter may be expressed either by the number of pulses supplied by the slow rate generator during the action period or by the period during which the controller acts, or again by the amplitude of the displacement of the regulating unit. Regardless of the concrete form of construction of the storage and control unit, it must perform the succession of logical operations hereinbefore defined. The devices performing these operations may be as shown in FIGURE 4, i.e. they comprise A storage member; a programming member reacting on the member to return it to zero; a return-to-zero member connected to the programming member; contacts 15, 16, 14, 18, 17 operated respectively by the detector, the slow rate pulse generator, the storage member, the programming member and the high rate pulse generator. The contact 14 closes one of the breaks in the programming circuit 12 as long as the storage member is not at zero; on the other hand, it breaks this circuit at the same time that it closes a contact in the feed circuit of the high rate pulse generator when the storage member is at zero. The contact 18 completes the feed circuit of the high rate pulse generator as long as the storage member is not at zero.

Referring again to FIGURE 3, a contact 10, disposed between the relay and the slow rate generator and controlled by the programming member, makes it possible to maintain the break in the connection between the relay and slow rate generator as long as the programming member is in operation.

If the controller acts by electric pulses on the regulating unit, the member for recording this action may be, for example, a step-by-step switch (of a type similar to a telephone switch) which advances by one step at each pulse supplied by the controller. Starting from the zero stud at the instant when the action of the controller is triggered, such a switch reaches a stud N when, after N pulses supplied by the controller to the regulating unit, the regulated quantity is returned through the desired value. The programming member employed in such cases may consist of the same step-by-step switch associated with a relay system. At the instant when the quantity has returned to the desired value, the relay system under consideration marks a voltage at the contact stud $P-N/K'$ of the switch (P being the total number of studs, or steps, of the switch and $K'$ an integer hereinafter defined), advances the switch from the stud N to the stud $P-N/K'$ without acting on the regulating unit, whereafter it triggers the high-rate pulse generator, which transmits the feedback order to the regulating unit. The switch then advances by one step at each pulse of the high rate generator and, after $N/K'$ pulses, returns to its zero position, thus breaking the feedback circuit and returning the compensator into the recording position.

The value of $K'$ is so chosen that, taking into account their duration, the $N/K'$ pulses of the high rate generator produce a negative feedback corresponding to the total action fraction $1/K$ chosen. In practice, it is preferred to operate with pulses each having the same (or substantially the same) duration in the control circuit and in the compensating circuit, so that in the case $K'$ may be made equal to K.

The improvement according to the invention is naturally not limited to the use of storage and control unit such as the step-by-step switch which has just been described. Any other unit may be employed which is capable of carrying out the recording of an action as defined above and bringing about immediately afterwards the intervention of the high rate generator until the injection of the appropriate degree of negative feedback, as previously defined.

Figure 1:
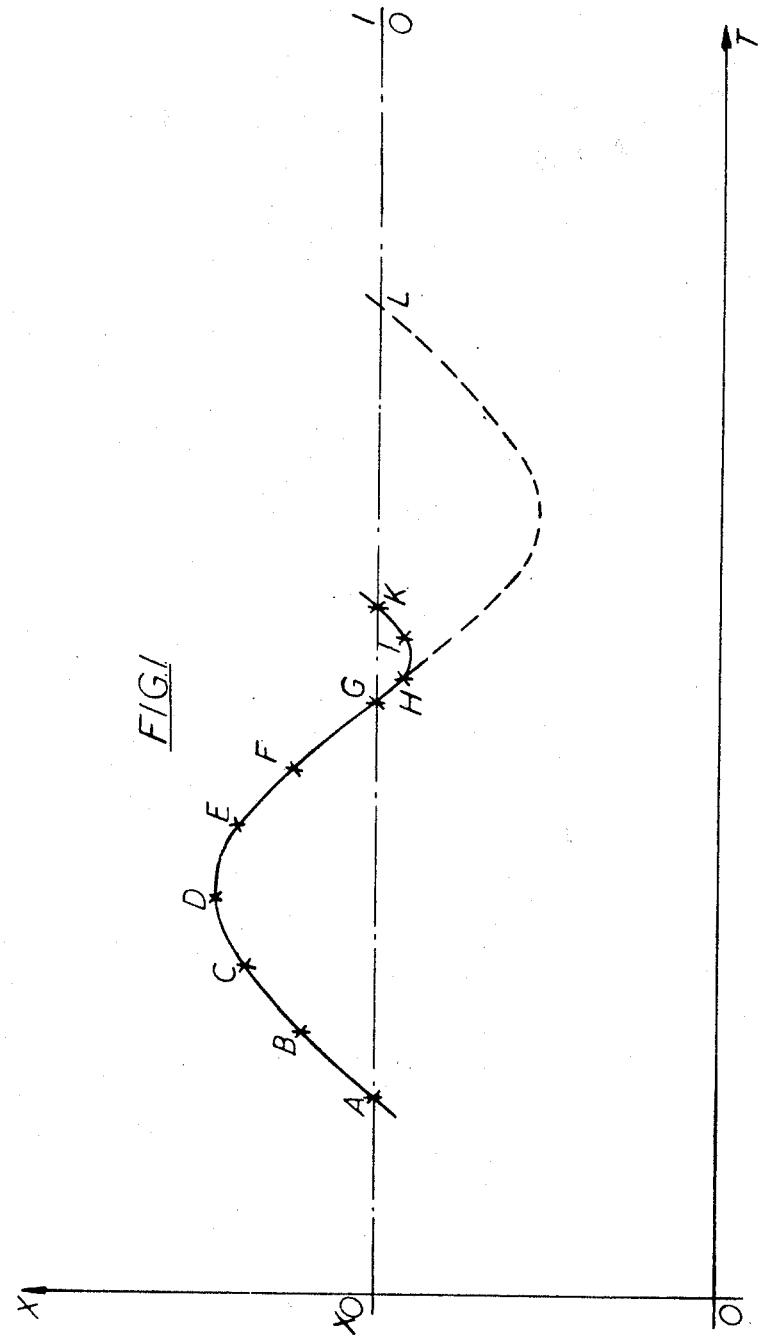
FIG. 1 shows graphically the relation between a quantity to be controlled and time.

This correspondence between the action quantity produced by the controller and the degree of negative feedback to be applied, i.e. the factor $1/K$, is established as a function of the characteristics of the regulated system. If the change of this system under the action of the controller may be represented by a symmetrical curve as is the curved portion ADG of FIGURE 1, it appears to be advantageous to adapt the value $\frac{1}{2}$ for $1/K$.

Apart from the various members which have hereinbefore been enumerated, the circuits of the control assemblies such as those illustrated in FIGURES 2 and 3 comprise a number of links: link between the detector on the one hand and the relay and the contact 15 on the other hand; link between the relay and the input of the slow rate generator; link between the slow rate pulse generator and the regulating unit and with the contact 16; link between the contacts 14 and 18 and the input of the high rate pulse generator link between the high rate pulse generator with the regulating unit and with the contact 17 of the return to zero member of the programmer.

These various links may be of the mechanical type, of the pneumatic type or of the electrical type, depending upon the types of apparatus to be connected.

The operation of a controlling and compensating assembly as just described will readily be apparent from consideration of the diagrams of FIGURES 2, 3 and 4. Taking, for example, the diagram of FIGURE 2, which (in conjunction with FIGURE 4) represents the case of a two-step regulation, the detector simultaneously actuates the relay and the contact 15 at the instant when the quantity to be regulated deviates from the desired value, for example by passing from the area O to the area I. At this stage, the contact 10 between the relay and slow rate generator is normally closed. The relay can therefore in turn trigger the slow rate generator, which transmits its pulses to the regulating unit. The recording (or storage) circuit 13, which has been closed at 15 under the influence of the detector, simultaneously records the action of the control circuit at each closing at 16 controlled, for example, by the pulses from the slow rate generator. At the instant when the quantity passes back through the desired value in the opposite direction, i.e. from the area I to the area O, the detector ceases to act on the relay and on the contact 15. The regulating circuit and the recording circuit 13 are then broken by the relay and contact 15. With regard to the programming circuit 12, of which the contact 14 has already been closed on starting of the storage member it is completely closed by 15, which is no longer controlled by the detector. The programmer is then set in operation, acts on the contacts 18 and 10, closing the break at 18 and opening the break at 10, between the relay and slow rate generator and assumes a predetermined state related to that which has been assumed by the storage member. At this instant, the quantity by which the storage member has measured the total action of the controller has been returned to zero, simultaneously closing at 14 the break in the feed circuit of the high rate generator. The latter thus becomes operative and transmits its rapid pulses to the regulating unit, thus triggering by means of an appropriate circuit arrangement an action opposite to the preceding one. The return-to-zero member 11 simultaneously acts at each closure of the contact 17 controlled, for example, by the pulses of the high rate generator. On returning to zero, the programmer again acts on the contacts 18 and 10, interrupting the operation of the high rate generator and reconnecting the relay with the slow rate generator. A further cycle can then commence. The break at 10 during the operating period of the programming member prevents any operation of the control circuit relay-slow rate generator-regulator under the influence of an accidental return of the regulated quantity into the area I, as long as the programmer has not terminated its action.

In the case of the system illustrated in FIGURE 3, which represents control by a three-step action controller, the relay and storage and control unit comprise in addition an arrangement by means of which they can be informed of the area in which the quantity is situated and can act accordingly, the controller operating in the extreme areas and the compensator operating with negative feedback in the centre area.

The control system comprising a compensator according to the invention may advantageously be employed with all integrating systems or systems having inertia, which do not change rapidly towards a new state of equilibrium after each modification of the regulating unit. An example of a system of this type is supplied by machines operating with an endless metal web for the production of films by the casting of a collodion. It is known that the ribbons of these machines, which can reach considerable dimensions (for example several tens of metres in developed length and a width of more than a metre) and which exert considerable forces (of the order of several tons) on the guide pulleys and the motor, have very considerable inertia. On the other hand, the requirements of regularity which must be met by the film make it necessary to limit very narrowly the lateral displacements which the ribbon inevitably undergoes under the influence of various causes. If such a machine is allowed to operate without a controller, regardless of the parallelism of the driving and guide pulleys, the ribbon undergoes considerable lateral displacements. This can be obviated by adjusting the orientation of the axis of the guide pulley by means of a regulating unit consisting of an electric servomotor with a worm and pinion mechanism, producing small displacements of one of the extremities of the axis of the guide pulley. The machine operator starts the regulating unit when he notices displacements of the ribbon in relation to reference marks, or better still, the said regulating device can be automatically started by a detector device.

Thus, a film-casting machine (FIGURE 5) having the following characteristics has been equipped with an automatic controller:

Developed length of the ribbon: 28 m.; width: 1.40 m.; force exerted on the bearings: 8 to 10 tons; linear velocity adjustable from 200 m. to 1200 m./hour. The machine was first regulated by a simple controller comprising: as detectors, two photo-resistant cells actuated by two light beams situated on either side of the web, perpendicularly thereto, and emitted by optical systems each having their focal point in one of the planes of the web, at 2.5 millimetres from the edges; a relay; a generator transmitting pulses whose duration is variable between 0.5 and 10 seconds and whose dead time is adjustable between 0.5 and 10 minutes; a regulating unit with an electric servomotor and a worm and pinion mechanism as hereinbefore defined, by means of which the bearing to which the action is applied can be displaced at a speed of the order of 0.4 millimetre per minute.

It was then sought to improve the regulation of the machine by incorporating in the aforesaid circuit, in accordance with the diagram of FIGURE 3, a negative feedback circuit comprising: a unit storage and control consisting of a telephone switch of the type previously described and adjusted for a value of $1/K$ equal to $\frac{1}{2}$, and a generator transmitting rapid pulses of a duration between 0.5 and 10 seconds and having an interval adjustable between 0.5 and 5 seconds.

In operation with the simple controller, under the best operating conditions for the latter, i.e., with pulses of a duration of 10 seconds and dead period of 6 minutes, appreciable displacements were still obtained, which were amplified at each oscillation of the ribbon, on either side of the limits fixed by the focal points of the light beams of the detection system. With the controller-compensator, using pulses of a duration of 10 seconds and dead period of 3 seconds in the feedback circuit, it was possible considerably to damp the oscillations, which were sustained by the simple regulating system.

Figure 5:
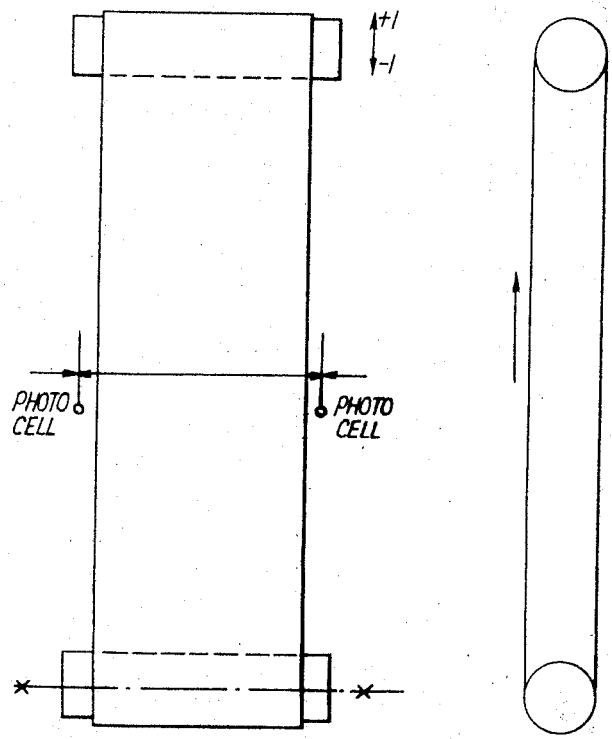
FIG. 5 illustrates a film coating member suitable for control by the controller of this invention.
Figure 6:
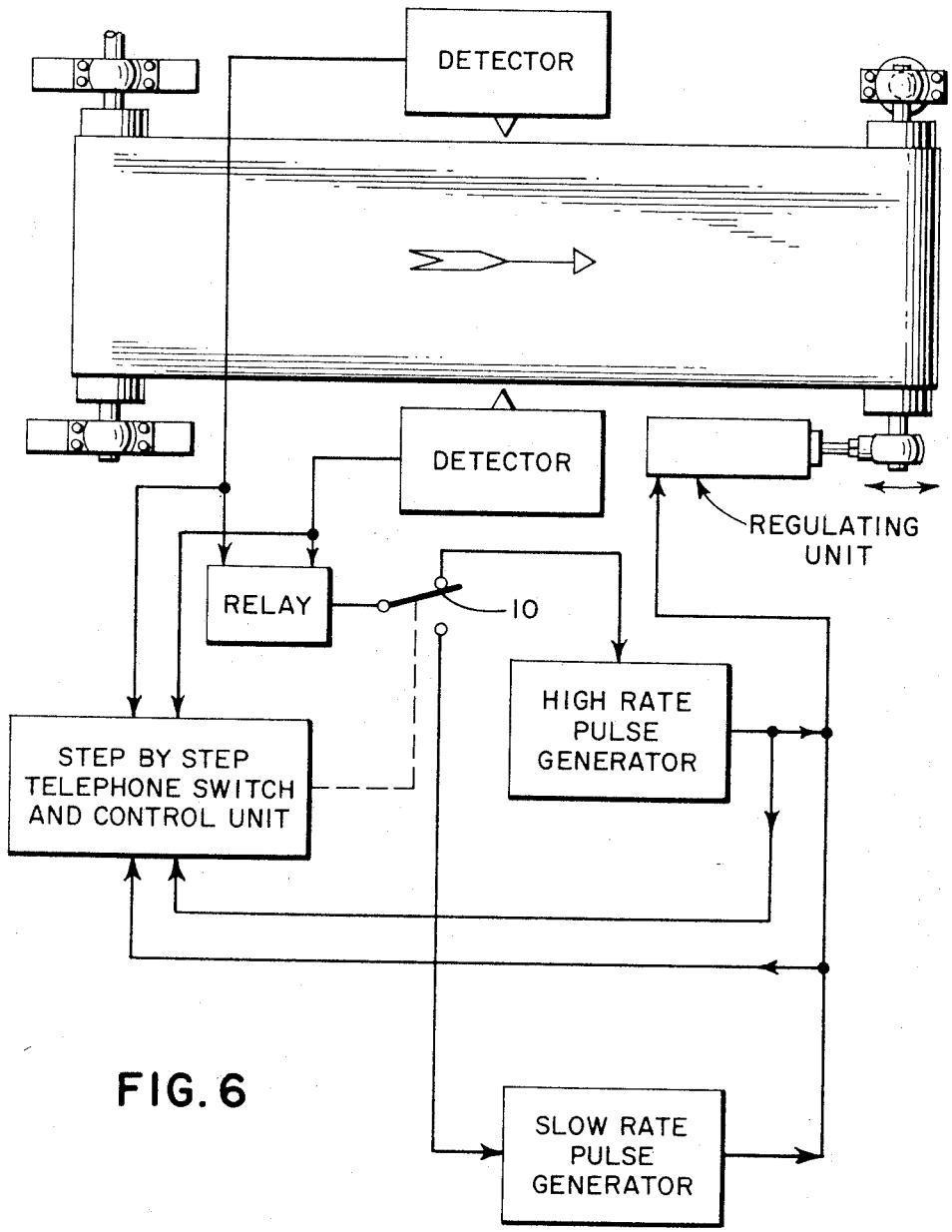
FIG. 6 is a block diagram showing an embodiment of the present invention in its environment.

FIG. 6 illustrates an embodiment of the present invention in its operational environment and is substantially a combination of the embodiments shown in the previously described FIGS. 3 and 5.

The regulating system operating with compensation makes it possible to explore high linear velocities at which the manual stabilisation of the ribbon would be substantially impossible without damage to the web.

I claim:
1. An intermittently operated controlling means for maintaining a parameter of an element in a system at a desired value comprising means for moving the position of the element, detector means for detecting a deviation of the element from the desired parameter, pulse generating means responsive to said detector detecting a deviation of said element from said parameter, regulator means responsive to said pulse generating means and operatively connected to said means for effecting lateral displacement of said element, an initial deviation of said element from said desired parameter causing an initial correction to laterally displace said element towards the desired parameter, storage means connected to said pulse generating means to record therein the action of said controlling means, and control circuit means responsive to the return of said element to within the desired parameter to cause said regulating means to apply a subsequent correction, of opposite direction to the initial correction, to said element, said subsequent correction being on the order of $1/K$, where K is greater than 1.

2. A controlling means according to claim 1 in which said pulse generating means comprises first and second pulse generators for generating pulses at a first frequency and at a second frequency respectively, said storage means actuating said second pulse generator when said detector means detects that the element has returned to within the desired parameter, the second frequency pulses being supplied to said regulator means to cause it to apply a correction in the opposite direction to the initial correction.

3. A controlling means according to claim 2, in which the first frequency is lower than the second frequency and the duration of each pulse of both frequencies is the same.

4. A controlling means according to claim 3, in which the interval between the pulses of the higher frequency is in the range of $\frac{1}{10}$ to $\frac{1}{100}$ of the interval between the pulses of the lower frequency.

5. A controlling means according to claim 1, in which said detector means comprises first and second detectors, one of said detectors being operative when the element moves to one side of the desired parameter, and the other detector being operative when the element moves to the other side of the desired parameter, both said detectors being operatively connected to transmit a signal to said storage member and to said first frequency pulse generator.

6. A controlling means according to claim 5, in which said storage member is a step-by-step switch.

7. A controlling means according to claim 6, in which the detector means include photoelectric cell circuits.

References Cited

UNITED STATES PATENTS

| | | | |
|---|---|---|---|
| 2,078,669 | 4/1937 | King | 242—57.1 |
| 2,654,599 | 10/1953 | Fristie et al. | 226—21 |
| 2,777,069 | 1/1957 | Saeman | 250—219 |
| 2,860,840 | 11/1958 | Jacobsen | 242—57.1 |
| 2,883,559 | 4/1959 | Bailey | 250—219 |
| 2,931,917 | 4/1960 | Beelitz | 250—202 X |
| 2,961,548 | 11/1960 | Prell | 250—219 |
| 2,999,944 | 9/1961 | Laycak | 250—219 |
| 3,017,552 | 1/1962 | Brouwer | 250—219 |
| 3,073,495 | 1/1963 | Evers | 242—57.1 |
| 3,096,919 | 7/1963 | Snyder | 250—219 |

RALPH G. NILSON, *Primary Examiner.*

ARCHIE R. BORCHELT, *Examiner.*

E. STRICKLAND, M. A. LEAVITT,
*Assistant Examiners.*